(12) United States Patent
Lee

(10) Patent No.: US 6,511,032 B1
(45) Date of Patent: Jan. 28, 2003

(54) SEAT TRACK PROTECTOR ASSEMBLY FOR VEHICLE

(75) Inventor: James E Lee, Davisburg, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/996,971

(22) Filed: Nov. 20, 2001

(51) Int. Cl.$^7$ .................................................. B60N 2/07
(52) U.S. Cl. ...................... 248/429; 248/424; 296/65.13
(58) Field of Search ................. 248/429, 424, 248/430, 345.1; 296/68.1, 65.13; 312/334.27, 334.31

(56) References Cited

U.S. PATENT DOCUMENTS 5,285,993 A * 2/1994 Kamata et al. .......... 248/345.1
5,482,243 A * 1/1996 Minder .................... 248/345.1

* cited by examiner

Primary Examiner—Korie Chan
Assistant Examiner—Ingrid Weinhold
(74) Attorney, Agent, or Firm—Laura C. Hargitt

(57) ABSTRACT

A seat track protector assembly is provided for a vehicle. The seat track protector assembly includes a cover adapted to be disposed adjacent an end of a lower track member for a seat of the vehicle and adapted for movement by an upper track member of the seat. The seat track protector assembly also includes a spring cooperating with the lower track member and the cover to return the cover toward the end of the lower track member when the cover is moved away from the end of the lower track member by the upper track member.

22 Claims, 3 Drawing Sheets

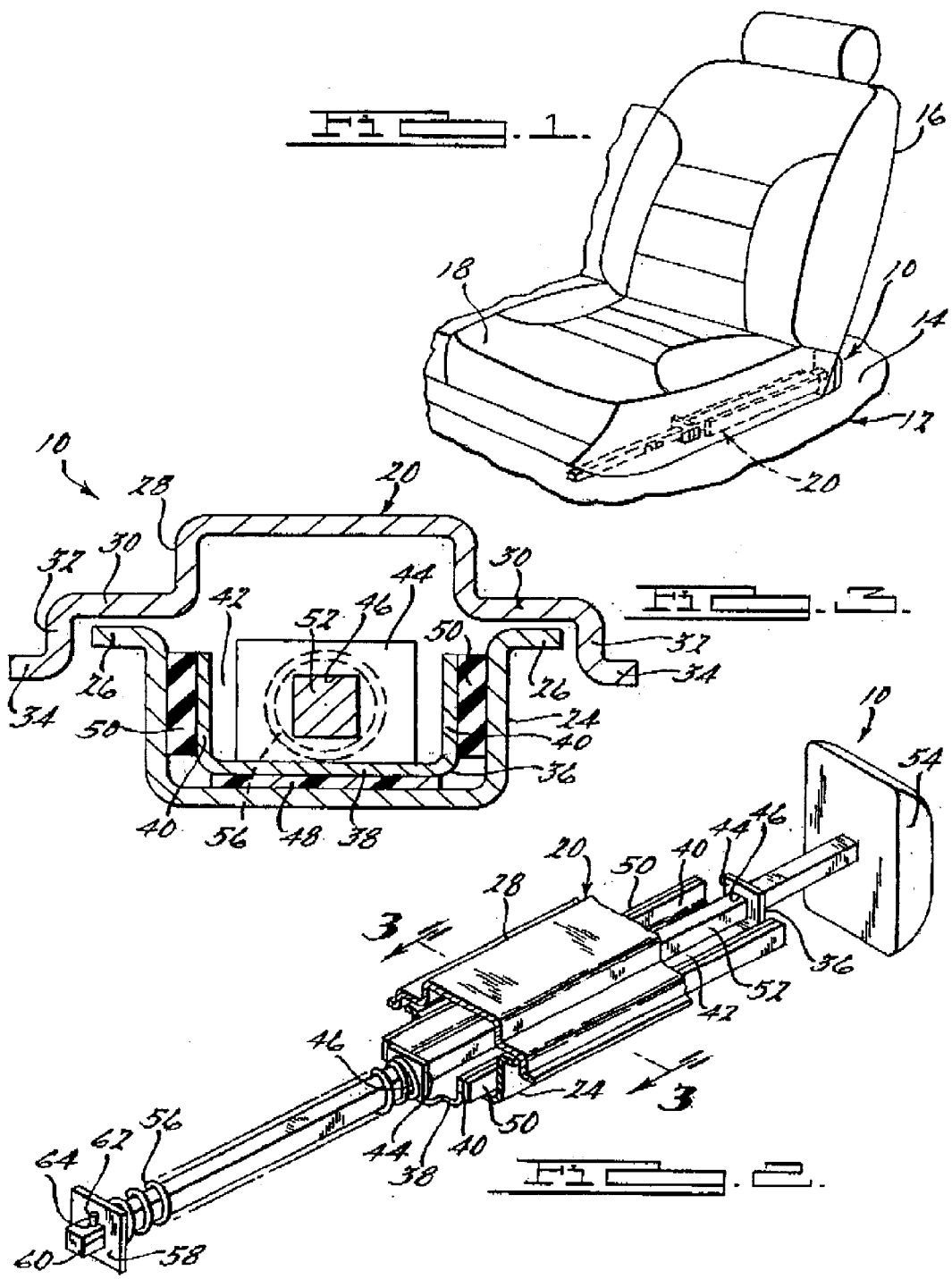

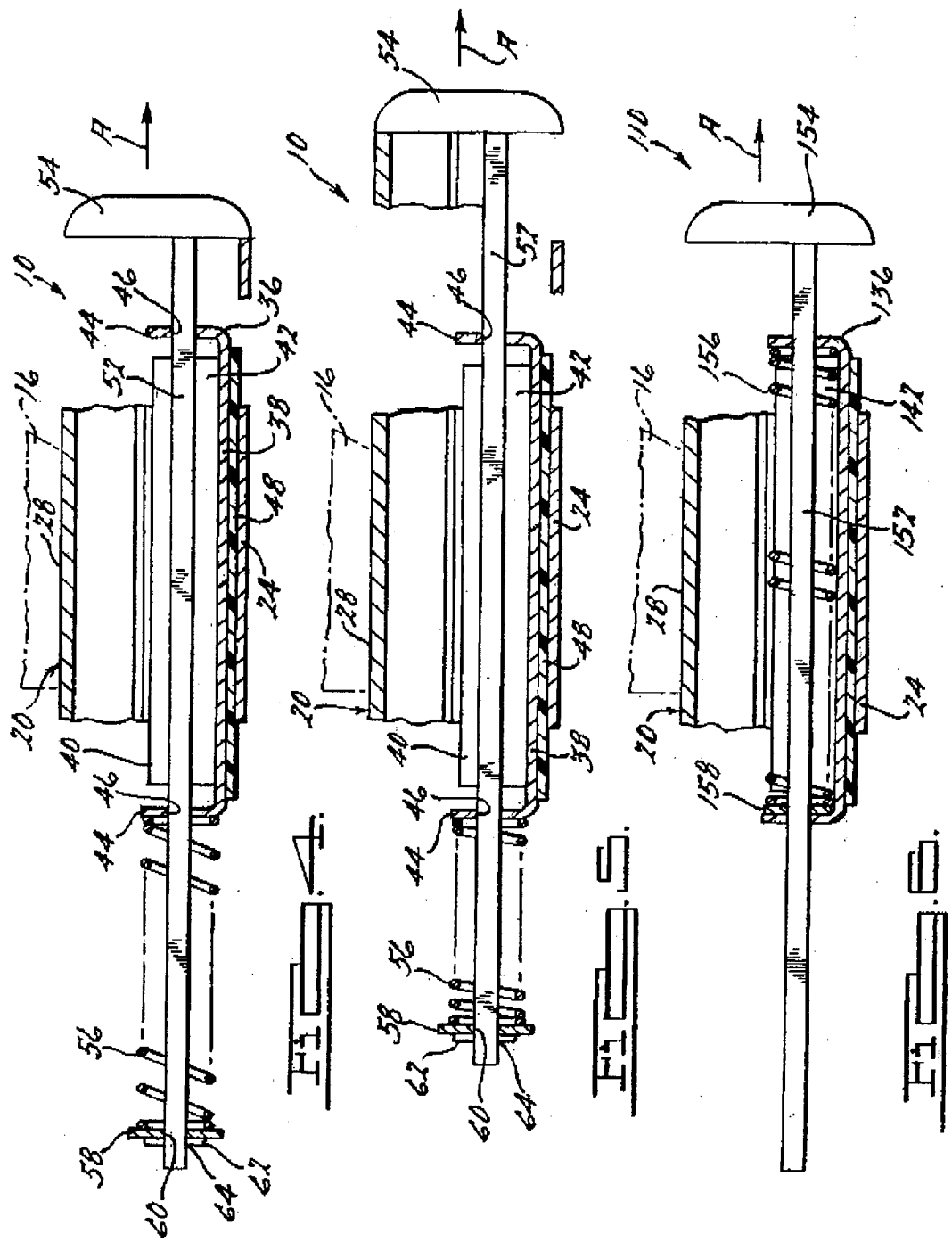

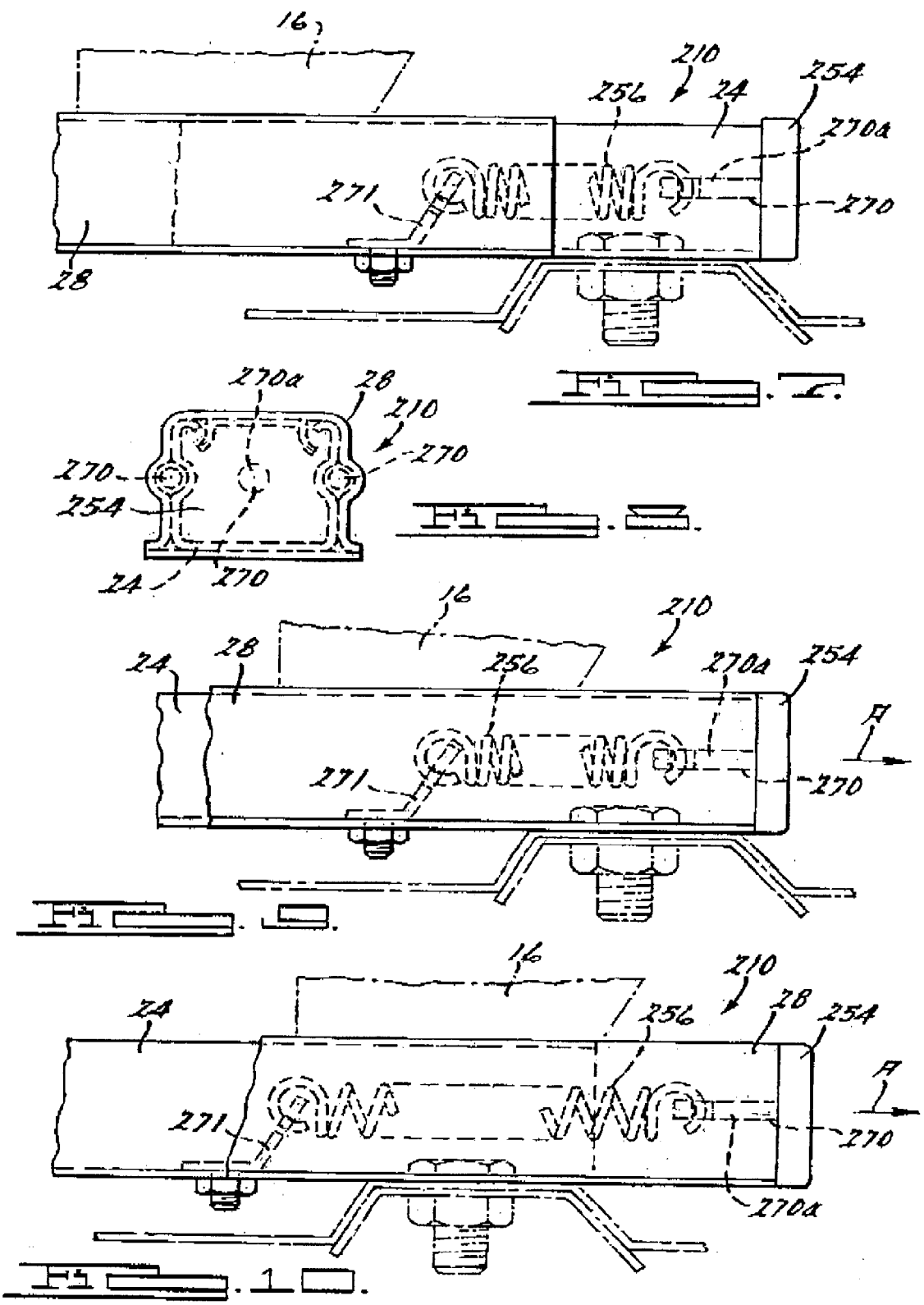

SEAT TRACK PROTECTOR ASSEMBLY FOR VEHICLE

TECHNICAL FIELD

The present invention relates generally to seats for vehicles and, more particularly, to a seat track protector assembly for a vehicle.

BACKGROUND OF THE INVENTION

It is known to provide a seat for a vehicle such as a sport utility vehicle or a pick-up truck. Typically, the seat includes a generally horizontal seat portion and a generally vertical back portion operatively connected to the seat portion. The seat may include at least one, preferably a pair of tracks to allow longitudinal adjustment of the seat portion. The tracks are spaced laterally and extend longitudinally and are secured to vehicle structure such as a seat riser by suitable means such as fasteners. The tracks are steel, rolled sections with a fixed lower track member and a sliding upper track member. The tracks may be manually adjusted longitudinally or by power. When the seat is adjusted rearward, the upper track member moves into a rear passenger occupant foot space where it can be contacted by a foot of an occupant.

SUMMARY OF THE INVENTION

The present invention is a seat track protector assembly for a vehicle. The seat track protector assembly includes a cover for a rear of a seat track, which matches a shape of an upper track member and moves with the upper track member until it is disposed on a lower: track member for the seat track as the upper track member moves forward of the lower track member. In addition, the seat track protector assembly includes a spring cooperating with the cover and is attached to the fixed lower track. As the upper track member moves rearward, the cover is engaged and moved rearward, thereby providing protection in any seat position.

The seat track protector assembly of the present invention is disposed over a track member of the seat, substantially: reducing risk of sharp foot contact with the track member by an occupant. The seat track protector assembly also improves the appearance of the seat track. The assembly is self-contained to fit to an existing seat track using simple fasteners from under the seat track. Therefore, it provides an easy retrofit while offering a durable, tamper-resistant character.

Other objects and features of the present invention will be readily appreciated, as the same becomes better understood, after reading the subsequent description taken in conjunction with the accompanying drawings.

BRIEF DESCRIPTION OF DRAWINGS

FIG. 1 is a perspective view of a seat track protector assembly, according to the present invention, illustrated in operational relationship with a seat of a vehicle.

FIG. 2 is an enlarged perspective view of the seat track protect assembly of FIG. 1.

FIG. 3 is a sectional view taken along line 3—3 of FIG. 2.

FIG. 4 is a fragmentary side elevational view of the seat track protector assembly of FIG. 1 illustrating a first operational state.

FIG. 5 is a view similar to FIG. 4 of the seat track protector assembly illustrating a second operational state.

FIG. 6 is a fragmentary side elevational view of another embodiment, according to the present invention, of the seat track protector assembly of FIG. 1.

FIG. 7 is a side elevational view of yet another embodiment, according to the present invention, of the seat track protector assembly of FIG. 1 illustrating first operational state.

FIG. 8 is a rear elevational view of the seat track protector assembly of FIG. 7.

FIG. 9 is a front elevational view of the seat track protector assembly of FIG. 7 illustrating a second operational state.

FIG. 10 is a front elevational view of the seat track protector assembly of FIG. 7 illustrating a third operational state.

DESCRIPTION OF THE PREFERRED EMBODIMENT

Referring to the drawings and in particular FIGS. 1 through 3, one embodiment of a seat track protector assembly 10, according to the present invention, is shown for a vehicle, generally indicated at 12. The vehicle 12 includes a vehicle body (partially shown) having a floor 14 and a seat 16 mounted to the floor 14. The seat 16 has a seat portion 18 operatively connected to the floor 14 by one or more seat rails or tracks, generally indicated at 20. It should be appreciated that, except for the seat track protector assembly 10, the vehicle 12 and seat 16 are conventional and known in the art.

The seat tracks 20 are spaced laterally and extend longitudinally. Each seat track 20 includes a lower track member 24. The lower track member 24 is generally "U" shaped with a flange 26 at each upper end extending laterally for a function to be described. The lower track member 24 is connected to a seat riser (not shown) of the floor 14 by suitable means such as fasteners (not shown). It should be appreciated that there are two seat tracks 20 per seat and that the lower track member 24 is attached to an outboard and inboard seat riser. It should also be appreciated that the seat track protector assembly 10 is used on each seat track 20.

Each seat track 20 also includes an upper track member 28 to slide along the lower track member 24. The upper track member 28 has an inverted general "U" shape with: a first flange 30 at each lower end extending laterally. The first flange 30 overlaps the flange 26 of the lower track member 24 and slides relative thereto. The upper track member 28 has a second flange: 32 extending perpendicularly from the first flange, 30 and a third flange 34 extending perpendicularly and laterally from the second flange 32 to cover a side edge of the flange 26 of the lower track member 24. The track members 24 and 28 are made of a rigid material such as metal. The upper track member 28, is connected to a seat pan (not shown) by suitable means such as welding. It should be appreciated that the seat tracks 20 are conventional and known in the art. It should also be appreciated that the lower track member 24 is fixed and the upper track member 28 may be moved manually or be powered by suitable means (not shown).

Referring to FIGS. 2 and 3, the seat track protector assembly 10, according to the present invention, is mounted to the lower track member 24 of the seat track 20. The seat track protector assembly 10 includes a channel member 36 disposed within the lower track member 24. The channel member 36 extends longitudinally with a generally "U" cross-sectional shape. The channel member 36 has a base wall 38 and a pair of opposed sidewalls 40 at the lateral sides thereof extending upwardly and generally perpendicular to the base wall 38 to form a channel 42. The channel member 36 has a pair of opposed end walls 44 at the longitudinal ends thereof extending upwardly and generally perpendicular to the base wall 38. The end walls 44 have an aperture 46 extending longitudinally therethrough. The aperture 46 is generally rectangular in shape for a function to be described. The channel member 36 is made of a metal material such as steel.

The seat track protector assembly 10 also includes a tape 48 for securing the channel member 36 to the lower track member 24. The tape 48 is of an adhesive type, preferably a structural bonding tape disposed between the base wall 38 of the channel member 36 and a base wall of the lower track member 24 to adhesively secure the channel member 36 to the lower track member 24. The tape 48 is generally planar and rectangular in shape. It should be appreciated that the tape 48 is conventional and known in the art.

The seat track protector assembly 10 includes a plurality of bumpers 50 disposed between the sidewalls 40 of the channel member 36 and sidewalls of the lower track member 24. The bumpers 50 are made of an elastomeric material such as rubber. The bumpers 50 are generally planar and rectangular in shape. The bumpers 50 limit the channel member 36 from contacting the lower track member 24. It should be appreciated that the bumpers 50 are conventional and known in the art.

The seat track protector assembly 10 also includes a pin 52 extending longitudinally and through the apertures 46 of the channel member 36. The pin 52 is generally rectangular in cross-sectional shape. The pin 52 is made of a metal material such as steel. The pin 52 extends longitudinally beyond the end walls 44 of the channel member 36 for a function to be described. It should be appreciated that the apertures 46 of the channel member 36 and the cross-sectional shape of the pin 52 are complementary to prevent rotation of the pin 52.

The seat track protector assembly 10 includes an end or trim cover 54 disposed about one end of the pin 52. The cover 54 is made of a rigid material such as a metal material such as steel. The cover 54 may be of any suitable shape and is attached to the end of the pin 52 by suitable means such as welding. It should be appreciated that the cover 54 covers a longitudinal end of the seat tracks 20.

The seat track protector assembly 10 also includes a spring 56 disposed about the pin 52 between an end of the pin 52 and one of the end walls 44 of the channel member 36. The spring 56 is of a coil type for a function to be described. It should be appreciated that a compression of the spring 56 is equal to a longitudinal travel of the seat 16.

The seat track protector assembly 10 further includes a spring retainer 58 for retaining the spring 56 on the pin 52. The spring retainer 58 is generally rectangular in shape and has an aperture 60 extending therethrough. The aperture 60 is generally rectangular in shape to allow the pin 52 to extend therethrough. The spring retainer 58 is a plate made of a rigid material such as plastic. The seat track protector assembly 10 further includes a pin member 62 such as a hairpin or cotter pin that extends into an aperture 64 in the pin 52 adjacent the spring retainer 58. It should be appreciated that the pin member 62 prevents the spring retainer 58 from exiting the pin 52.

Referring to FIGS. 4 and 5, in operation of the seat track protector assembly 10, the seat track protector assembly 10 is spring-loaded and self-contained, which fits to the lower track member 24 of the seat tracks 20 for the seat 16 as illustrated in FIG. 4. As the seat 16 is moved longitudinally rearward as indicated by the arrow A, the upper track member 28 engages the cover 54. As a result, the cover 54 and pin 52 move rearward to compress the spring 56 between the spring retainer 58 and the end wall 44 of the channel member 36 as illustrated in FIG. 5. As the seat 16 moves longitudinally forward, the spring 56 urges the spring retainer 58 away from the end wall 44 of the channel member 36, causing the pin 52 and cover 54 to be returned to cover the end of the lower track member 24 as illustrated in FIG. 4. It should be appreciated that the cover 54 protects both the upper and lower track members 24 and 28 and moves rearward as the upper track member 28 moves rearward relative to the lower track member 24.

Referring to FIG. 6, another embodiment, according to the present invention, of the seat track protector assembly 10 is shown. Like parts of the seat track protector assembly 10 have like reference numerals increased by one hundred (100). In this embodiment, the seat track protector assembly 110 has the spring 156 disposed about the pin 152 and in the channel 142 of the channel member 136. The seat track protector assembly 110 also has the spring retainer 158 disposed about the pin 152 and in the channel 142. The operation of the seat track protector assembly 110 is similar to the seat track protector 10. It should be appreciated that the seat track protector assembly 10 and 110 are self-contained units, which fit into the lower track member 24.

Referring to FIGS. 7 through 10, yet another embodiment, according to the present invention, of the seat track protector assembly 10 is shown. Like parts of the seat track protector assembly 10 have like reference numerals increased by two hundred (200). In this embodiment, the seat track protector assembly 210 has only the cover 254 and the spring 256. The cover 254 has at least one, preferably a plurality of projections 270 extending axially. The spring 256 has one end connected to one of the projections 270, preferably a center projection 270a and the other end is connected to the lower track member 24 via a retainer 271. The other projections 270 fit within the end of the lower track member 24 when the cover 254 is adjacent the lower track member 24. The operation of the seat track protector assembly 210 is similar to the seat track protector 10 in that, as the seat 16 is moved longitudinally rearward as indicated by the arrow A, the upper track member 28 engages the cover 254 to move the cover 254 rearward as illustrated in FIG. 10 and the spring 256 causes the cover 254 to be returned to cover the end of the lower track member 24 when the upper track member 28 moves forward as illustrated in FIGS. 7 and 9.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat track protector assembly for a vehicle comprising:

a cover adapted to be disposed adjacent an end of a lower track member for a seat of the vehicle and adapted for movement by an upper track member of the seat; and a spring cooperating with the lower track member and said cover to return said cover toward the end of the lower track member when said cover is moved away from the end of the lower track member by the upper track member.

2. A seat track protector assembly as set forth in claim 1 including a channel member adapted to be disposed in the lower track member.

3. A seat track protector assembly as set forth in claim 2 wherein said channel member comprises a base wall extending longitudinally and end walls extending perpendicular to longitudinal ends of said base wall and having an aperture extending longitudinally through the end wall.

4. A seat track protector assembly as set forth in claim 3 including a pin extending through said aperture in said channel member and connected to said cover.

5. A seat track protector assembly as set forth in claim 4 including a spring retainer disposed about said pin, said spring being disposed between said spring retainer and said channel member.

6. A seat track protector assembly as set forth in claim 5 including a pin member extending through said pin to prevent said spring retainer from exiting said pin.

7. A seat track protector assembly as set forth in claim 2 including a tape for securing said channel member to the lower track member.

8. A seat track protector assembly as set forth in claim 2 including at least one bumper to be disposed between said channel member and the lower track member.

9. A seat track protector assembly as set forth in claim 2 wherein said spring is a coil spring.

10. A seat track protector assembly as set forth in claim 4 wherein said spring is disposed about said pin either one of outside of said channel member and inside of said channel member.

11. A seat track protector assembly as set forth in claim 1 wherein said cover includes a plurality of projections extending therefrom and adapted to be disposed within the lower track member.

12. A seat track protector assembly as set forth in claim 11 wherein said spring is a coil spring connected to one of said projections and adapted to be connected to the lower track member.

13. A seat track protector assembly for a vehicle comprising:
    a channel member adapted to be disposed in and fixed to a lower track member for a seat of the vehicle;
    a pin extending longitudinally through longitudinal ends of said channel member;
    a cover connected to one of the longitudinal ends of said pin and adapted to be disposed adjacent an end of the lower track member and adapted for movement by an upper track member of the seat; and
    a coil spring disposed about said pin and cooperating with said channel member to urge said cover toward the end of the lower track member when moved away from the end of the lower track member by the upper track member.

14. A seat track protector assembly as set forth in claim 11 wherein said channel member comprises a base wall extending longitudinally and end walls extending perpendicular to longitudinal ends of said base wall and having an aperture extending longitudinally through the end walls.

15. A seat track protector assembly as set forth in claim 14 wherein said aperture is generally rectangular in shape.

16. A seat track protector assembly as set forth in claim 14 wherein a pin is generally rectangular in shape and extends through said aperture.

17. A seat track protector assembly as set forth in claim 13 including a spring retainer disposed about said pin, said spring being disposed between said spring retainer and said channel member.

18. A seat track protector assembly as set forth in claim 17 including a pin member extending through said pin to prevent said spring retainer from exiting said pin.

19. A seat track protector assembly as set forth in claim 13 including a tape for securing said channel member to the lower track member.

20. A seat track protector assembly as set forth in claim 13 including at least one bumper to be disposed between said channel member and the lower track member.

21. A seat track protector assembly as set forth in claim 13 wherein said spring is disposed about said pin either one of outside of said channel member and inside of said channel member.

22. A seat track assembly for a vehicle comprising:
    at least one seat track having a lower track member adapted to be fixed to a vehicle structure and an upper track member adapted to be connected to a seat and moveable relative to the lower track member;
    a channel member disposed in said lower track member;
    a pin extending through said channel member;
    a cover connected to said pin to cover an end of said lower track member; and
    a spring disposed about said pin and cooperating with said channel member to urge said cover toward the end of said lower track member when said cover is moved away from the end of said lower track member by said upper track member.

* * * * *